United States Patent
Kösters

(10) Patent No.: US 6,563,109 B1
(45) Date of Patent: May 13, 2003

(54) APPARATUS FOR OPTOELECTRONICALLY DETERMINING POWER USING A LIGHT SOURCE BEING OF ANNULAR DESIGN

(75) Inventor: Jürgen Kösters, Greven (DE)

(73) Assignee: KIR Kupplungstechnik GmbH, Rheine (DE)

( * ) Notice: Subject to any disclaimer, the term of this patent is extended or adjusted under 35 U.S.C. 154(b) by 0 days.

(21) Appl. No.: 09/726,298

(22) Filed: Nov. 27, 2000

(51) Int. Cl.[7] .................................................. H01J 3/14
(52) U.S. Cl. .............................. 250/237 G; 250/237 R; 250/231.15
(58) Field of Search ..................... 250/231.13, 231.16, 250/231.17, 231.18, 231.1, 237 G, 237 R, 231.15, 234, 231.14; 341/13; 73/862.08, 862.24, 862.23; 356/617, 616; 324/160, 161, 166

(56) References Cited

U.S. PATENT DOCUMENTS

| 5,917,182 A | * | 6/1999 | Ishizuka | 250/237 G |
| 6,002,249 A | * | 12/1999 | Futsuhara | 250/231.14 |
| 6,285,024 B1 | * | 9/2001 | Pinnock | 250/231.13 |

FOREIGN PATENT DOCUMENTS

| DE | 3426751 A1 | 1/1986 | G01L/3/08 |
| DE | 3816827 A1 | 11/1989 | G01L/3/08 |
| EP | 340 172 A1 | 4/1989 | G01L/3/12 |
| EP | 0 340 172 A1 | 11/1989 | G01L/3/12 |
| JP | 5-332780 | 12/1993 | G01L/21/00 |

* cited by examiner

*Primary Examiner*—Stephone Allen
*Assistant Examiner*—Bradford Hill
(74) *Attorney, Agent, or Firm*—Darby & Darby

(57) ABSTRACT

The present invention provides an apparatus for optoelectronically determining power for a moving machine element. The apparatus includes two parallel coding discs which are mounted on the machine element and each have grid lines or light windows distributed over their circumference. A light source is arranged on one side of the coding discs and has an associated light meter on the opposite side of the discs. The light source and the light meter are preferably of an annular design in order to transilluminate all the light windows to a largely uniform degree. A diffusion disc is arranged in the beam path between the light source and the coding discs and a light barrier is mounted outside the region of the light windows. At least one of the light windows on one of the coding discs is formed in the beam path of the light barrier and a translucent endless zone is formed on the other of the parallel coding discs.

30 Claims, 5 Drawing Sheets

APPARATUS FOR OPTOELECTRONICALLY DETERMINING POWER USING A LIGHT SOURCE BEING OF ANNULAR DESIGN

TECHNICAL FIELD

The present invention relates to an apparatus for optoelectronically determining power for a moving machine element and more particularly, relates to an apparatus for measuring torque and rotational speed of the moving machine element simultaneously and in a simplistic yet effective manner.

BACKGROUND OF THE INVENTION

The derived physical torque (M) is defined as the product of the force (F) and the vertical distance of its line of application (lever arm) from the center of rotation, and is a significant measure of the loading on a drive. In many cases, recording of the torque is sufficient for monitoring and controlling rotary motion. However, the derived physical principle or fundamental quantity of mechanics is power (P). This is defined as the product of rotational speed and torque.

Power recording is indispensable for the complete characterization of a drive. By way of example, the quantities power and rotational speed are always specified for designing a motor. If two quantities are cited, the third variable can be calculated. The resultant maximum torque of a motor is calculated from the equation M=P/n, where n is the number of revolutions within one unit of time.

One example which may be taken is a stirring mechanism whose mixer rod is equipped with an apparatus for determining torque in accordance with DE patent 198 49 225, which is herein incorporated by reference in its entirety. The firmer the liquid mass to be stirred becomes, the higher the torque bearing on the mixer rod becomes. Thus, the torque measured is a measure of the viscosity of the substance to be stirred. When the torque reaches a prescribed value, processing of the material is terminated and further processes can be started automatically.

If the quantity rotational speed is additionally recorded, a statement can be made about the power which is to be applied. Statements can be made about the choice of the motor and the design of the drive components. In general, there is always interplay between the three quantities power (P), torque (M) and rotational speed (n). Provided that a motor always applies its maximum constant power, an increase in the torque always results in a reduction in the rotational speed, which can easily be seen from the relationship P=M×n.

Thus, it would be desirable to provide a simple apparatus which can effectively determine the torque and rotational speed of the moving machine element, e.g., a rotating machine element.

SUMMARY OF THE INVENTION

The present invention is based on the object of providing an apparatus which permits the two quantities which can be recorded on the machine element, namely torque and rotational speed, to be determined in a technically simple manner. The apparatus includes two parallel coding discs which are mounted on the machine element and each have grid lines or light windows distributed over their circumference. The application has a light source which is arranged on one side of the coding discs and an associated light meter is arranged on the opposite side of the discs. The light source and the light meter have an annular design in order to transilluminate all the light windows to a largely uniform degree, and a diffusion disc is arranged in a beam path between the light source and the coding discs.

According to the present invention, the object is achieved as a result of a light barrier being mounted outside the region of the light windows on the coding discs and at least one light window on one of the coding discs being formed in a beam path of the light barrier. In addition, a translucent, endless strip is formed on the other of the parallel coding discs.

The recording of the rotational speed is independent of the torsion, and hence of the torque determination, and is determined by the rotation. The optronic components light-emitting diode and photodiode are mounted directly in front of the discs. During operation, the user is provided with both a torque voltage signal and a rotational speed pulsed signal. To calculate the power, the rotational speed needs to be calculated from the rotation signal and multiplied by the measured torque. There are many items of measuring equipment which measure the quantities torque and rotational speed simultaneously. However, no measuring equipment is known in which the combination of the aforementioned measurement principles are implemented with the same level of technical simplicity. The present invention provides such an apparatus.

These and other features, aspects and advantages of the present invention can be further appreciated from the accompanying Figures, Description of the Figures, and Detailed Description of the Illustrative Exemplary Embodiment.

BRIEF DESCRIPTION OF THE DRAWINGS

The foregoing and other features of the present invention will be more readily apparent from the following detailed description and drawings of an illustrative embodiment of the invention in which.

DETAILED DESCRIPTION OF THE ILLUSTRATIVE EXEMPLARY EMBODIMENT

Figure 1:
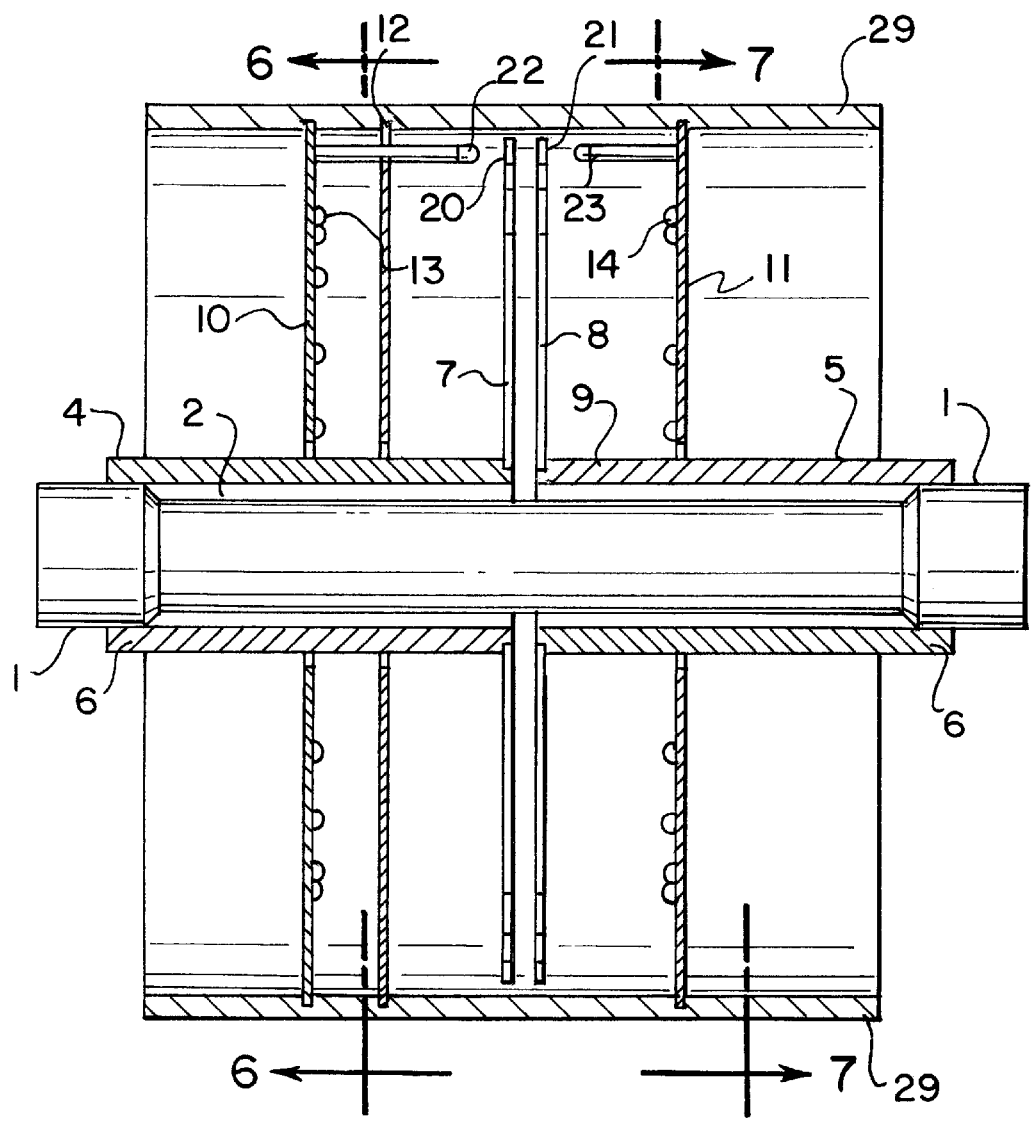
FIG. 1 shows an axial section through an apparatus without a housing.
Figure 6:
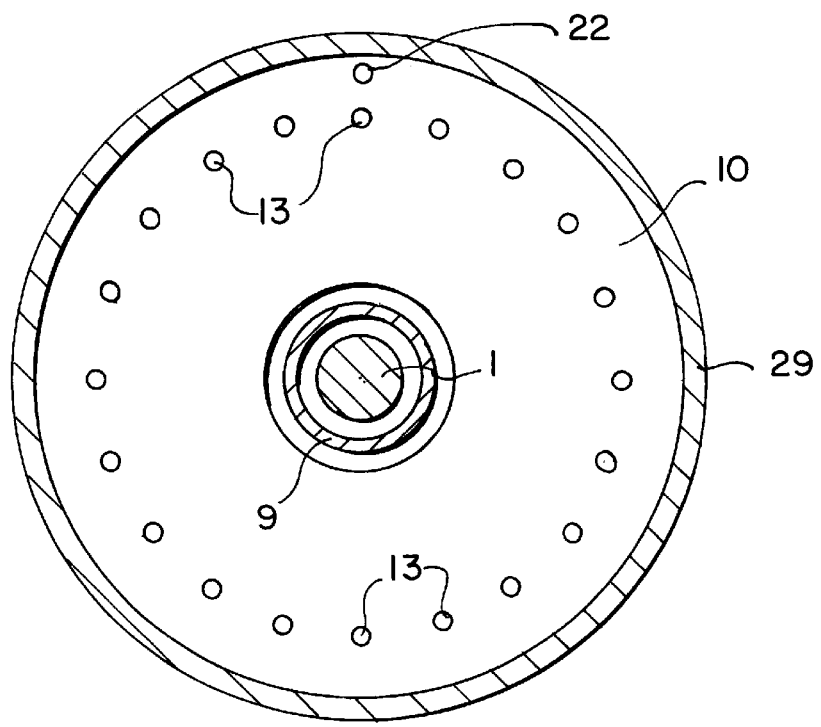
FIG. 6 is a sectional view taken along the line 6—6 of FIG. 1.
Figure 7:
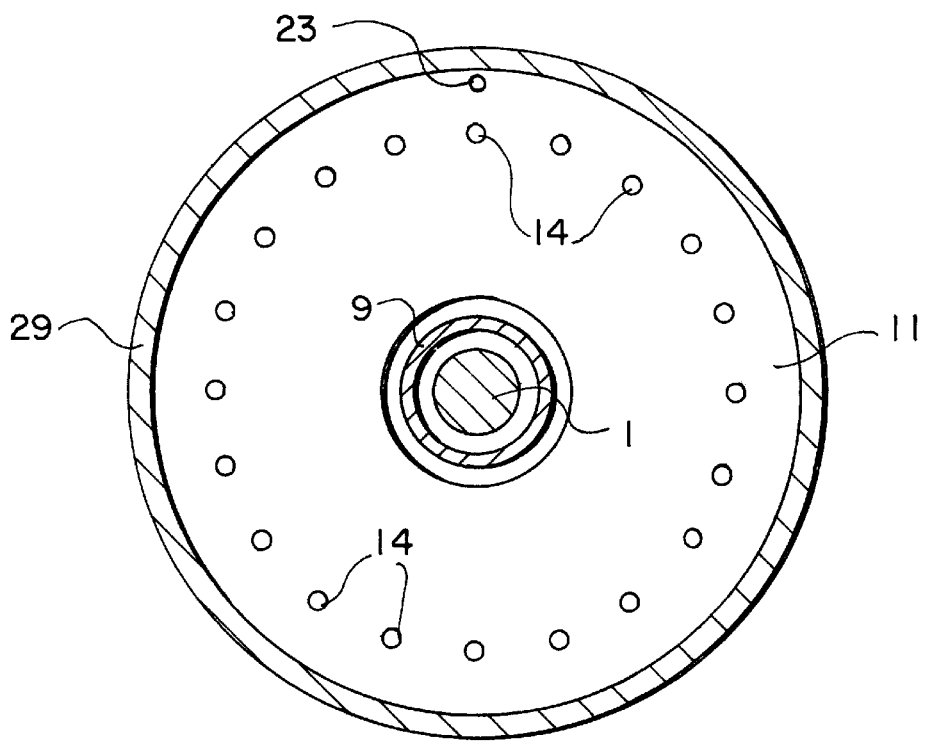
FIG. 7 is a sectional view taken along the line 7—7 of FIG. 1.

Referring first to FIG. 1, a shaft 1 is provided including a torque section 2 of reduced diameter having sleeves 4 and 5. The sleeves 4, 5 are firmly connected to the torsion shaft 1 by shrink fitting, for example, as indicated by 6. The adjacent free ends of the sleeves 4, 5 support annular discs 7 and 8. These can be prevented from rotating by an adhesive layer 9. Further annular discs 10, 11, and 12 are secured so as to be stationary on a housing 29. These surround the support sleeves 4, 5 with play. The discs 10, 11 are used for securing light-emitting diodes, arranged in the form of a ring, as sources 13 and photodiodes as light-measuring elements 14. In the exemplary embodiment, the sources 13 are carried on the annular disc 10 and the elements 14 are carried on the disc 11. It will be appreciated that the reverse may be true. The annular disc 12 is arranged in a beam path between the light-emitting diode disc 10 and the disc 7 and is used for diffusing the light beams emitted from the light-emitting diodes 13. Therefore, the annular disc 12 may be referred to as a diffusion disc. FIG. 6 illustrates the annular nature (ring-like) of the light-emitting diodes and FIG. 7 illustrates the annular nature (ring-like) of the light-measuring elements 14.

Figure 2:
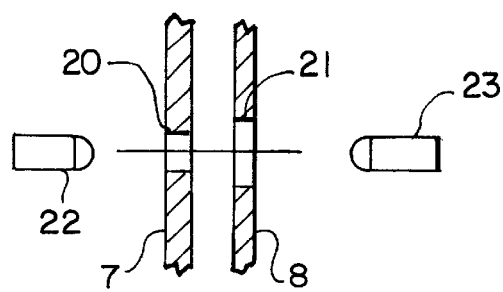
FIG. 2 shows the arrangement of one exemplary light barrier on a larger scale.
Figure 3:
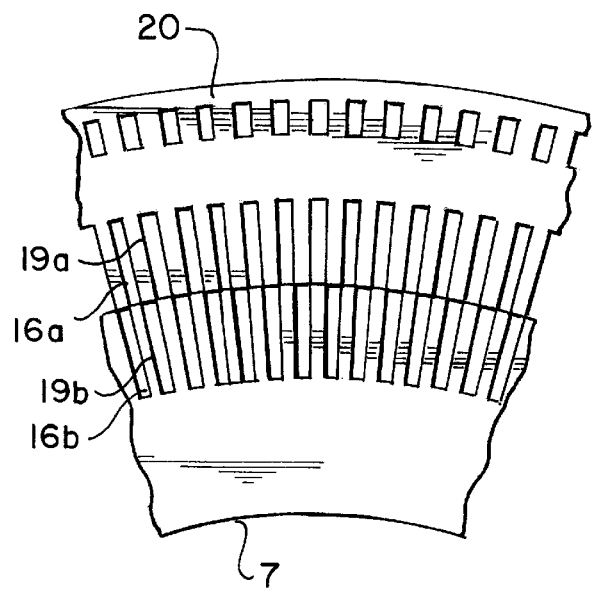
FIG. 3 shows details of exemplary coding discs.
Figure 3:
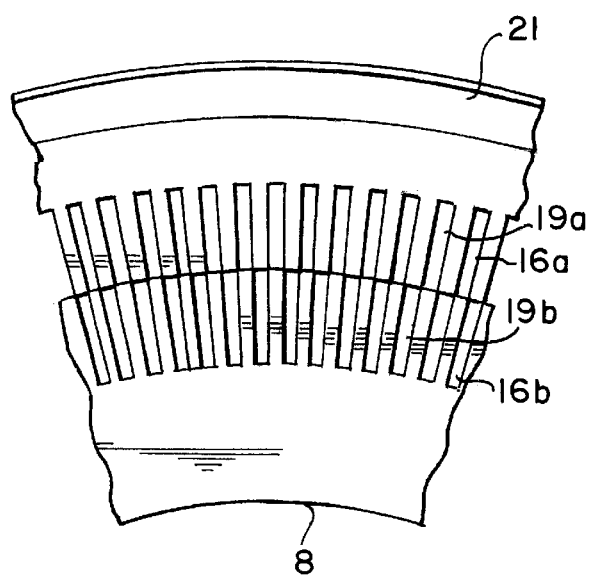
Figure 4:
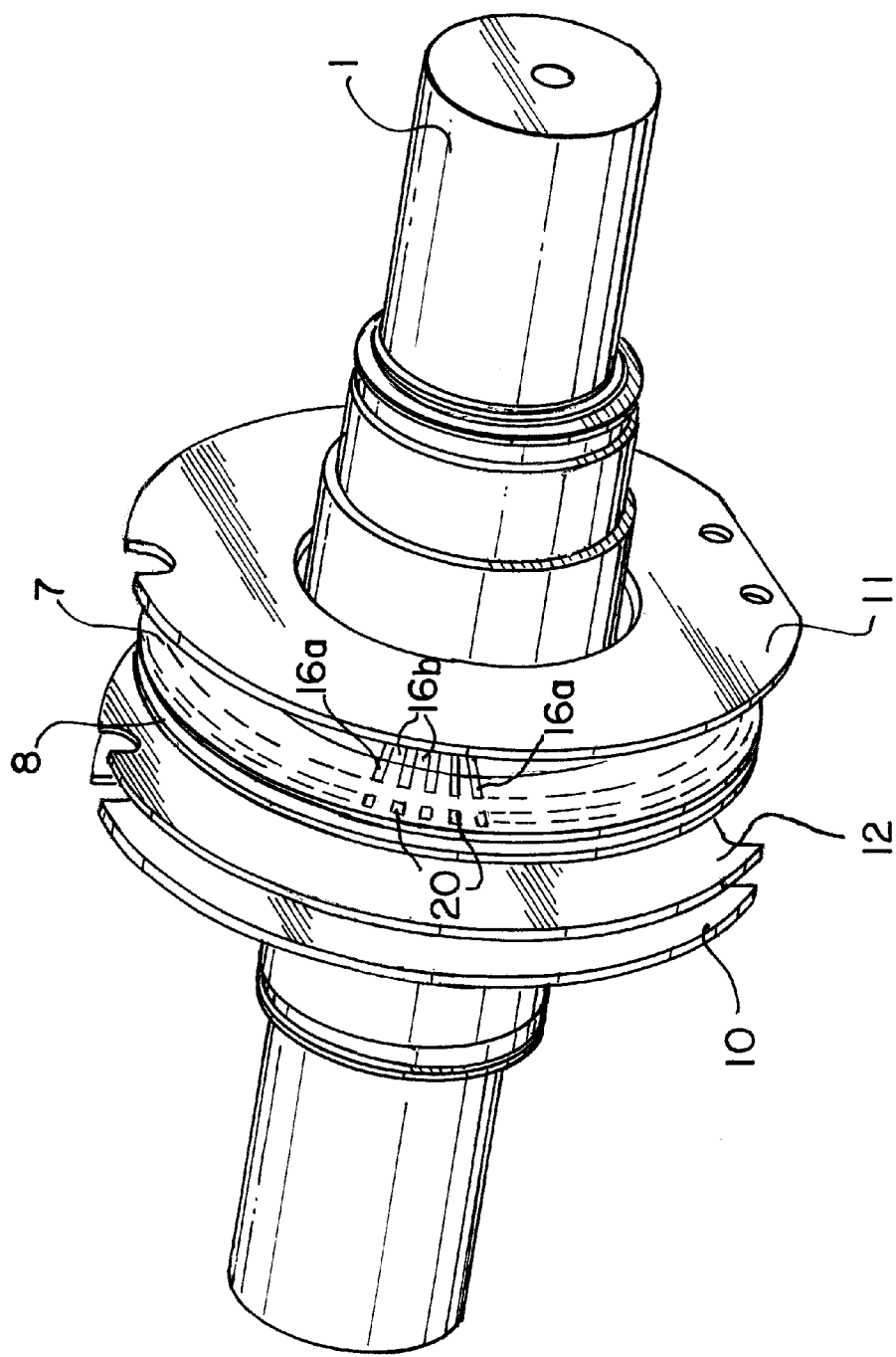
FIG. 4 shows a diagrammatic illustration of the present apparatus.

Referring now to FIGS. 1 through 3, the directly opposite discs 7, 8 are supports for opaque webs and light windows 16a and 16b and are called coding discs as discussed hereinafter. The discs 7, 8 are also carriers for opaque grid lines, generally indicated at 19a, 19b. The light windows 16a, 16b and grid lines 19a, 19b are arranged in two centric zones. The two zones are offset from one another by a line thickness. This is intended to ensure that, when the annular optical system is rotated and orientated accurately, the average amount of light which gets through in a light beam of finite thickness whose center point migrates along the boundary between two zones remains essentially constant.

When a torque occurs, the two outer ends of the machine element and the shaft 1 are rotated in relation to each other. In one embodiment, the moving machine element is a rotating machine element. The sleeves 4, 5 transmit the torsion to the encoder discs 7, 8 situated at their free ends, which rotate to the same extent in relation to each other. As a result, the passage cross sections for the light passing through are changed. The amount of light passing through, which changes proportionally with the torsion, is picked up by the photodiodes of the disc 11 and converted into electrical voltage. Further electronic processing is carried out using a suitable electronic device, such as the one disclosed in DE 198 49 225 C1 assigned to the assignee hereof and which is herein incorporated by reference in its entirety.

The arrangement of the light windows 16a, 16b for determining the torque may be referred to as a torque track.

According to the present invention, on a larger radius than the arrangement of the light windows 16a, 16b, there is provided a further track for determining the rotational speed. This other track comprises light windows 20 formed on the coding disc 7 and a strip 21, made of a translucent material, of finite width on the adjacent and opposing coding disc 8 (FIG. 3). The light windows 20 and the strip 21 may be referred to as a rotational speed track.

Directly beside the window side of the rotational side of the rotational speed track there is a light-emitting diode 22 as light source, and on the side of the translucent strip, there is a photodiode 23 as a light-measuring element. In other words, the light-emitting diode 22 faces the coding disc 20 which carries the windows 20 and the photodiode 23 faces the coding disc 8 which carries the strip 21. Hereinafter, the combination of the light-emitting diode 22 and the photodiode 23 will be referred to as a light barrier or a light measuring device.

As can be seen in FIG. 2, in particular, the pattern of the rotational speed track is scanned by the light barrier. The light beam emitted from the light-emitting diode 22 impinges on the disc pair 7, 8. On rotation, the opposite photodiode 23 records dark zones and light zones alternatively. An output signal delivered by the rotational speed unit comprises a voltage whose level fluctuates between a zero level and a maximum level in time within the windows. The output signal is generally called a square-wave signal or a square-wave pulse. During one revolution, a number of pulses are produced. For purpose of illustration only, in one exemplary revolution 180 pulses are produced. To calculate the rotational speed, the number of pulses per unit time are counted. The more pulses are counted in a particular time interval, the higher the rotational speed.

If, for example, 180 pulses counted within one minute, then the rotational speed is equal to 1 rpm. At high rotational speeds, measurements are taken at shorter time intervals (e.g., 1 s) and the result is projected to the rotation speed unit of 1 min.

The number of windows 20 for recording the rotational speed is of no significance for general calculation. There are systems which each produce only a single pulse per revolution. However, the corresponding systems have the disadvantage that a change in rotational speed can be established only after a further revolution. Changes in rotational speed, or, more precisely, changes in the angular velocity inside one revolution, are thus not recorded. It is therefore advantageous to provide a multiplicity of light windows, e.g., 180 over a full circle of 360°, for recording fluctuations in rotational speed during one revolution.

Figure 5:
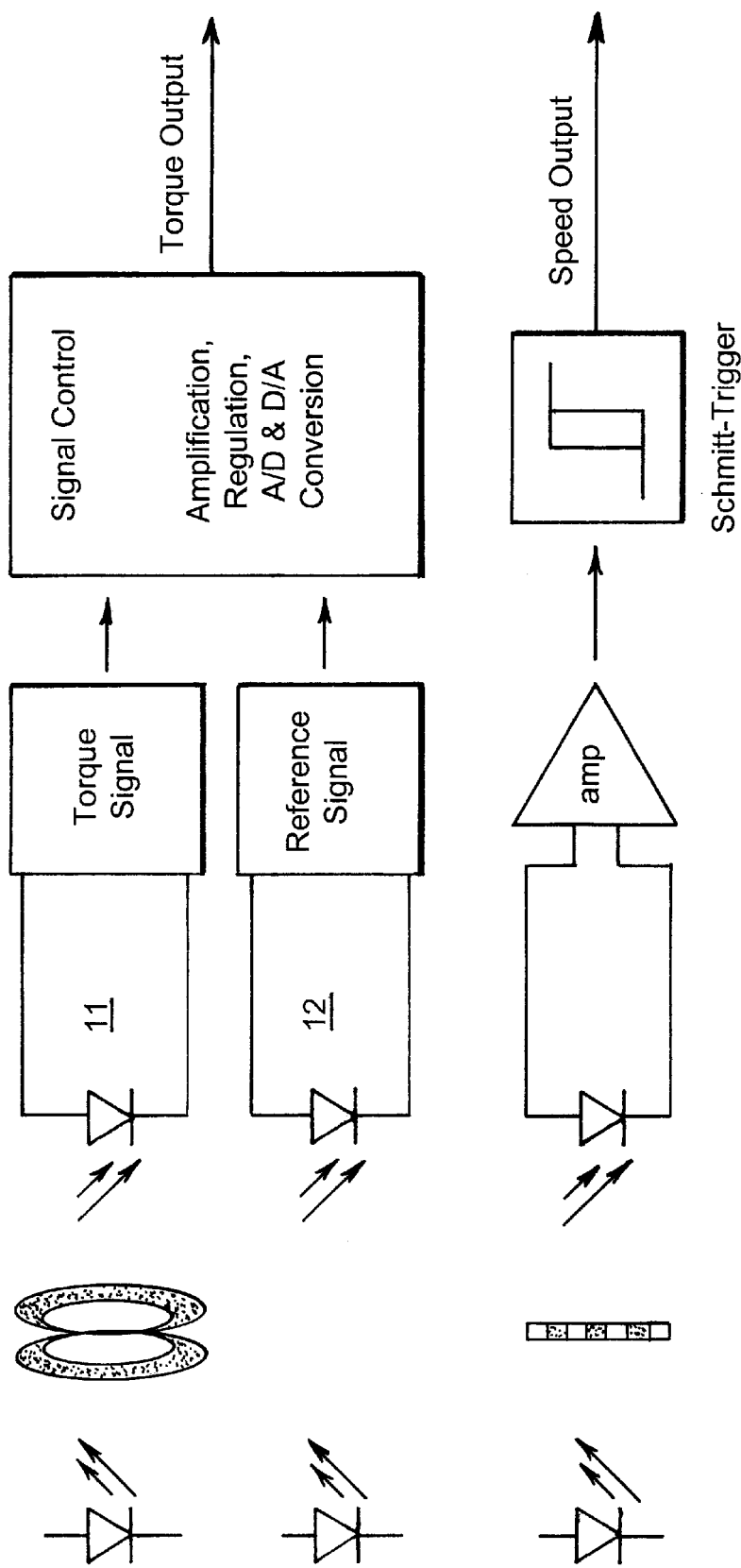
FIG. 5 shows a block diagram of one exemplary electronic evaluation device.

The signals are electronically processed further in the form of electrical voltages in the downstream electronic device shown in the block diagram of FIG. 5. One exemplary electronic device is described in greater detail in DE 198 49 225, which has been previously incorporated herein.

If the torsion shaft 1 is fitted with coupling elements on each end, the complete apparatus can be used in the form of a measuring coupling for continuously monitoring in the drive device and the like without any great assembly complexity. It permits contactless measurement with analogue measured-value recording and digital measured-value conditioning at a high measured value rate. There is no need for the transmission of energy to a rotating shaft or for the transmission of the measured values via radio or slip rings. This provides a beneficial alternative to the known systems.

The apparatus of the present invention thus provides an apparatus which permits the torque and rotational speed recorded on the machine element to be easily determined.

While the invention has been particularly shown and described with reference to the preferred embodiments thereof, it will be understood by those skilled in the art that various changes in form and detail may be made therein without departing from the spirit and scope of the invention.

What is claimed is:

1. An apparatus for optoelectronically determining power for a moving machine element, the apparatus comprising:

two parallel coding discs which are mounted on the machine element, each disc having grid lines and light windows distributed over circumferences thereof;

a first light source which is arranged on one side of the coding discs and an associated first light meter is arranged on the opposite side of the discs, each of the first light source and the first light meter being of annular design in order to transilluminate all the light windows to a largely uniform degree, wherein the first light meter continuously measures the amount of light passing through the coding discs and this amount is converted into a signal representative of torque;

a diffusion disc being arranged in a first beam path between the light source and the coding discs; and a light measuring device being mounted outside a region of the light windows with at least one light window on one of the coding discs being formed in a beam path of a light source of the light-measuring device and a translucent, uninterrupted and endless zone is disposed on the other of the parallel coding discs.

2. The apparatus of claim 1, wherein a multiplicity of light windows are provided for recording fluctuations in rotational speed during one revolution.

3. The apparatus of claim 2, wherein the multiplicity of light windows comprises about 180 windows provided over a 360° circumference.

4. The apparatus of claim 1, wherein the grid lines on each coding disc are subdivided into two concentric annular zones, and the grid lines of one zone are offset in the circumferential direction by one line thickness with respect to those of the other zone.

5. The apparatus of claim 1, wherein the coding discs are arranged with respect to one another in such a way that when there is no torque, half the amount of light, as referred to its maximum value, passes through both coding discs.

6. The apparatus of claim 1, wherein each coding disc is permanently arranged at the free end of a carrying sleeve, and each carrying sleeve is permanently connected, at its end facing away from the coding disc, to the machine element that is loaded by torque.

7. The apparatus of claim 1, wherein the machine element subjected to the torque is a shaft.

8. The apparatus of claim 1, wherein the light measuring device comprises a second light source facing one of the two parallel coding discs and a light-measuring element facing the other of the two parallel coding discs.

9. The apparatus of claim 8, wherein the second light source is comprises a second light-emitting diode and the light-measuring element comprises a photodiode.

10. The apparatus of claim 1, wherein the light measuring device is disposed between the diffusing disc and the first light meter.

11. The apparatus of claim 8, wherein the second light source is disposed between the diffusing disc and one of the two parallel coding discs.

12. The apparatus of claim 8, wherein the light-measuring element is disposed between one of the two parallel coding discs and the light meter.

13. The apparatus of claim 1, wherein the first light source comprises a predetermined number of light-emitting diodes.

14. The apparatus of claim 13, wherein the light-emitting diodes are arranged in the form of a ring.

15. The apparatus of claim 1, wherein the first light meter comprises a predetermined number of photodiodes.

16. The apparatus of claim 1, wherein the at least one window ands the translucent strip define a rotational speed track of the apparatus, the rotation speed track having a pattern which is scanned by the light measuring device.

17. The apparatus of claim 16, wherein an output signal is generated by a rotational speed unit as the apparatus rotates, the output signal comprising a voltage whose level fluctuates between a zero level when the at least one light window is not axially aligned with the beam path of the light measuring device and a maximum level when the at least one light window is axially aligned with the beam path.

18. The apparatus of claim 1, wherein a multiplicity of light windows are axially aligned with the translucent zone, the multiplicity of light windows being annularly formed along an outer periphery of one of the coding discs, each of the multiplicity of light windows being formed in the beam path of the light measuring device.

19. An apparatus for optoelectronically determining power for a moving machine element, the apparatus comprising:

two parallel coding discs which are mounted on the machine element, each disc have grid lines and light windows distributed over circumferences thereof;

a first light source arranged on one side of the coding discs and an associated first light meter arranged on an opposite side of the discs, each of the first light source and the first light meter being of an annular design in order to transilluminate all the light windows to a largely uniform degree;

a diffusion disc arranged in a first beam path between the first light source and the coding discs; and a light measuring device mounted outside of a region of the light windows with at least one light window on one of the coding discs being formed in a second beam path of the light measuring device and a translucent, uninterrupted and endless zone is disposed on the other of the parallel coding discs, wherein torque is determined by measuring the amount of light passing through the coding discs from the first light source to the first light meter and power of the moving machine element is determined as a function of the measured torque and light measured by the light measuring device.

20. The apparatus of claim 19, wherein the grid lines on each coding disc are subdivided into two concentric annular zones, and the grid lines of one zone are offset in the circumferential direction by one line thickness with respect to those of the other zone.

21. The apparatus of claim 20, wherein the amount of light measured by the first light meter is converted into a torque voltage signal.

22. The apparatus of claim 19, wherein rotation speed is determined by the light measuring device.

23. The apparatus of claim 22, wherein the light measuring device generates a rotational speed pulsed signal that represents the rotation speed.

24. The apparatus of claim 19, wherein the first light source and the first light meter are disposed radially inward from the measuring device which comprises a second light source facing one of the two parallel coding discs and a light measuring element facing the other of the two parallel discs.

25. The apparatus of claim 19, wherein the first light source comprises a predetermined number of light-emitting diodes arranged in a shape of a ring.

26. The apparatus of claim 19, wherein the at least one window and the translucent strip define a rotational speed track of the apparatus, the rotation speed track having a pattern which is scanned by the light measuring device and whereupon a rotational speed pulsed signal is generated.

27. The apparatus of claim 19, wherein a multiplicity of light windows are provided for recording fluctuations in rotational speed during one revolution.

28. The apparatus of claim 19, wherein the coding discs are arranged with respect to one another in such a way that when there is no torque, half the amount of light, as referred to its maximum value, passes through both coding discs.

29. The apparatus of claim 19, wherein the light measuring device is disposed between the diffusion disc and the light meter.

30. The apparatus of claim 19, wherein the light measuring device and the first light source and the first light meter are fixed in stationary positions relative to the coding discs which freely rotate, with the coding discs disposed between a second light source and light measuring element of the light measuring device and between the first light source and the first light meter.

* * * * *

UNITED STATES PATENT AND TRADEMARK OFFICE
CERTIFICATE OF CORRECTION

PATENT NO.    : 6,563,109 B1
DATED         : May 13, 2003
INVENTOR(S)   : Jürgen Kösters It is certified that error appears in the above-identified patent and that said Letters Patent is hereby corrected as shown below:

<u>Title page,</u>
Item [73], Assignee, "KIR Kupplungstechnik GmbH" should be -- KTR Kupplungstechnik GmbH --

Signed and Sealed this

Eighteenth Day of November, 2003

JAMES E. ROGAN
*Director of the United States Patent and Trademark Office*